Oct. 24, 1933. K. VON BRETHORST 1,932,054
SCRAPER AND CLEANER FOR TRACTOR WHEELS
Filed March 14, 1932
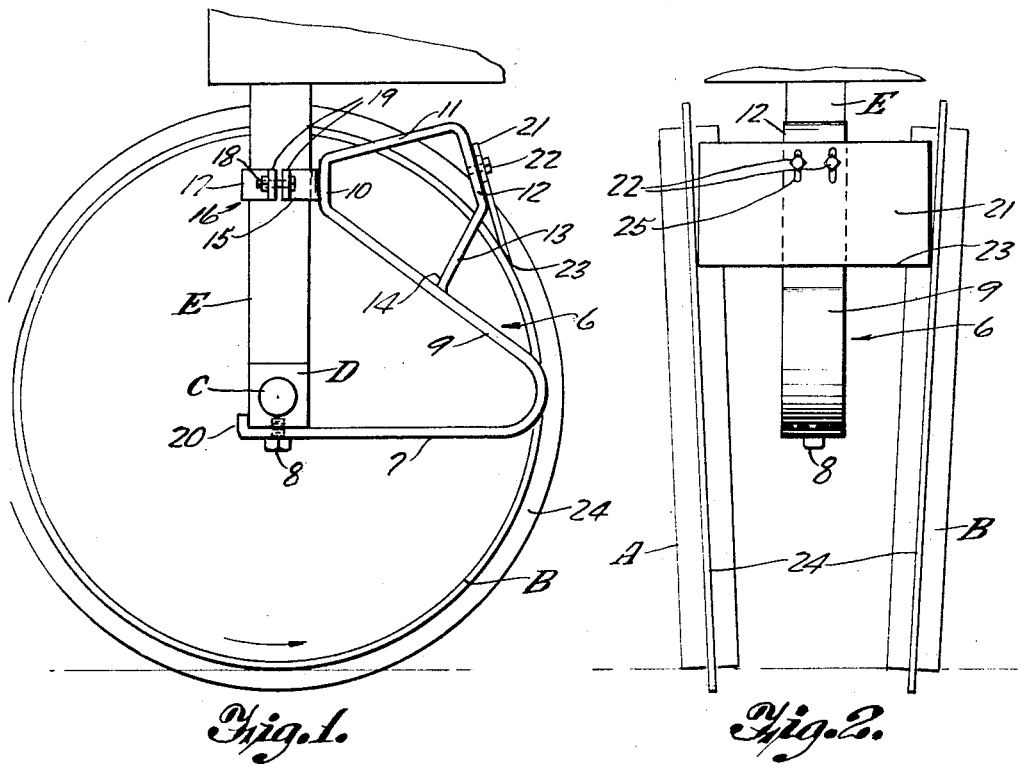
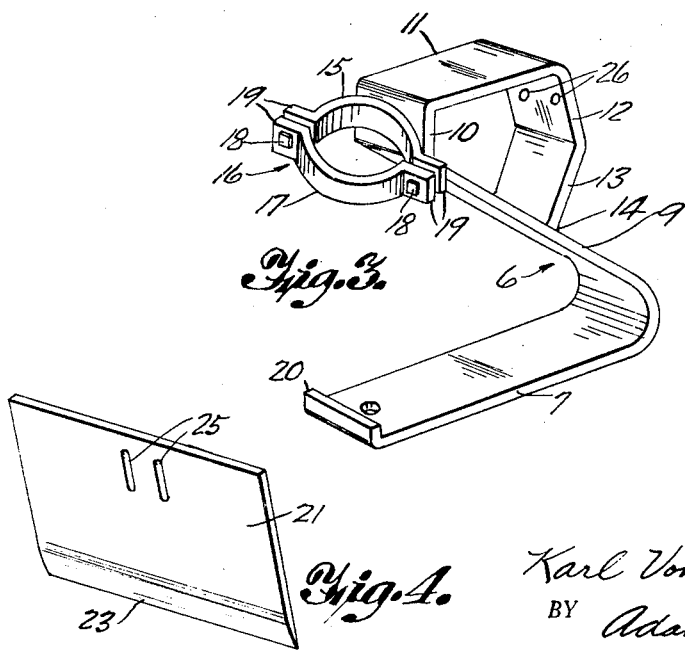
INVENTOR.
Karl Von Brethorst
BY Adam E. Fisher
ATTORNEY.

Patented Oct. 24, 1933

1,932,054

UNITED STATES PATENT OFFICE 1,932,054

SCRAPER AND CLEANER FOR TRACTOR WHEELS

Karl von Brethorst, Loda, Ill.

Application March 14, 1932. Serial No. 598,546

2 Claims. (Cl. 280—158)

This invention relates to improvements in scrapers and cleaners for tractor wheels.

The main object of the invention is to provide a scraper and cleaner for use upon the front wheels of tractors or other implements and which will effectively and thoroughly clean all mud and other substances from the peripheries of the wheels so that they will turn freely.

Another and important object is to provide a cleaner and scraper adapted for cleaning the relatively closely set front wheels of tractors or implements and which is so constructed that a part of the scraper blade supporting structure is so disposed as to clean off all mud and the like from between the wheels before it reaches the scraper blade which then scrapes off all the mud and other materials adhering to the peripheries of the wheels.

Another object is to provide a cleaner and scraper device of this kind which is simple, inexpensive, sturdy and compact in construction and which may be mounted between the tractor or implement wheels out of the way of any other parts or attachments to the tractor.

The foregoing and other objects together with means whereby the same may be carried into effect will best be understood from the following description of a preferred embodiment of my invention taken in connection with the accompanying drawing wherein:

Figure 1 is a side view of the cleaner and scraper mounted on a tractor front wheel assembly, the near wheel being removed.

Figure 2 is a rear view of the cleaner and scraper and wheel assembly.

Figure 3 is a perspective view of the blade supporting structure.

Figure 4 is a perspective view of the scraper blade alone.

Referring now with more particularity to the drawing A and B designate the front wheels of a tractor which are placed relatively closely together as shown and which are journaled on the dirigible axle C mounted in the block D at the lower end of the steering post E, said axle and block being rotated in conventional manner by the steering wheel (not shown) for steering the tractor. The post E is stationary and contains the steering shaft (not shown) turning the axle, block and wheels.

My scraping and cleaning device comprises a blade supporting structure or frame designated generally at 6 which is formed of a strip or length of heavy flat metal formed to provide a straight attaching arm 7 which is secured at one end by a stud bolt 8 to the underside of the block D at a medial point thereof. From this block D the arm 7 extends horizontally and rearwardly to a point substantially in alignment with the rims of the wheels A and B and the strip is then bent angularly upward and forward to provide a reach 9 extending to a point adjacent the steering post E. The bend between the arm 7 and reach 9 is gradual and rounded as shown for a purpose to be described. The strip is then bent vertically upward alongside the steering post E for a short distance forming a shoulder 10 and is then bent rearwardly and angularly upward at 11, is bent downwardly and slightly rearwardly forming a blade mounting shoulder 12 and the end 13 is then bent downwardly into engagement with the upwardly extending reach 9 and is welded or otherwise secured thereto at 14. One half or section 15 of a collar 16 is riveted or welded to the shoulder 10 of the frame 6 and is adapted to fit over the rear of the steering post E and the other section 17 of said collar is placed over the post and bolted to the section 15 by bolts 18 passed through the ears 19. A lip or flange 20 is turned upwardly from the forward end of the arm 7 alongside the face of the block D to hold the arm 7 from turning and getting out of the proper alignment relative to the axle C. The frame assembly thus formed is simple, compact and rigid and requires no bracing. As the axle C and wheels A and B swing or oscillate as the tractor is steered the frame 6 will move or turn with the axle and maintain its proper position relative to the wheels. The collar 16 is attached loosely to the steering post E to turn freely thereon as the wheels and the frame 6 are turned in steering. Should the steering post E be arranged to rotate with the axle as it turns from side to side the collar 16 may be clamped tightly to the post as will be understood.

A rectangular scraping blade 21 is provided and is secured by bolts 22 to the blade mounting shoulder 12 of the frame 6 which is so disposed that the sharpened lower edge 23 of the blade 21 will rest nearly in engagement with the peripheries of the wheels A and B and at substantially a tangential angle relative thereto whereby the blade will scrape the wheels clean of mud and the like. The blade is of such length or width as to extend outwardly over the peripheries of the wheels to a point adjacent the annular medial ribs 24 thereof and the blade is so positioned that the mud and other substances scraped from the wheels will be forced or thrown outward as the wheels rotate resulting in the entire surface of the wheel being cleaned while only the inner portions are actually engaged by the scraping blade as will be understood. The blade 21 may be adjusted toward or away from the wheel by the slots 25 in said blade through which the bolts 22 pass, said bolts being threaded in threaded apertures 26 in the frame 6. The attaching arm 7 of the frame 6 being disposed below the blade 21 and extending horizontally rearward between the wheels A and B the rounded bend between this arm and the reach 9 will clean off and throw outward any mud, stones or the like which might collect between the wheels before it reaches the blade 21 thus facilitating the complete and efficient cleaning of the wheels. The frame 6 being mounted entirely between the wheels and upwardly and rearwardly of the axle C is out of the way and will not interfere in any way with any attachment or tools which might be used with the tractor.

Further advantages and details of operation of the device will be apparent without further description at this point. It is understood that the device may be used upon other implements having relatively closely set wheels as well as the tractor as herein shown and described.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In combination with a steering post and an axle attached to the steering post and a pair of relatively closely set wheels journaled on the axle at each side of the steering post, a device of the kind described comprising a frame formed of a strip of metal bent to provide an attaching arm rigidly secured at one end to the axle and extending rearwardly to a point adjacent the rims of the wheels, a reach extended angularly upward and forward from the rear end of the attaching arm and connected thereto by a rounded bend, a shoulder formed on the reach adjacent the steering post, a collar secured to the shoulder and encircling said steering post, the said strip being bent rearwardly and upwardly from the shoulder and bent downwardly to form a blade mounted shoulder, a scraping blade adjustably mounted on the mounting shoulder and disposed angularly to and adjacent the peripheries of the wheels and the end of the strip being bent downwardly and forwardly and secured to a medial point of the reach.

2. A device of the kind described for use upon an assembly of steering post, an axle attached to the lower end of the steering post and of a pair of closely set wheels journaled at the ends of the axle at each side of the steering post, the same comprising a frame formed of a strip of metal bent to provide a lower attaching arm for rigidly securing at its intended forward end to the axle, and extending rearwardly to a point adjacent the rims of the wheels, a reach extended angularly upward and forward from the rear portion of the attaching arm and connected thereto by a rounded bend for cleaning débris from between the wheels, a shoulder formed on the reach adjacent the steering post, a collar secured to the shoulder and encircling the steering post, a rearwardly and upwardly disposed blade mounting shoulder, and a scraping blade on the blade mounting shoulder and disposed angularly downward adjacent the peripheries of the wheels above the said rounded débris cleaning bend of the structure.

KARL von BRETHORST.